March 21, 1933.  A. M. FAIRCHILD  1,902,630
CERAMIC CATALYZER
Filed July 6, 1929

Inventor
Alice Maude Fairchild
by Parker & Carter
Attorneys.

Patented Mar. 21, 1933

1,902,630

UNITED STATES PATENT OFFICE

ALICE MAUDE FAIRCHILD, OF CHICAGO, ILLINOIS, ASSIGNOR, BY MESNE ASSIGN-
MENTS, TO THE MANTLE LAMP COMPANY OF AMERICA, OF CHICAGO, ILLINOIS, A
CORPORATION OF ILLINOIS

CERAMIC CATALYZER

Application filed July 6, 1929. Serial No. 376,341.

My invention relates to a fluid rectifying refractory ceramic structure particularly adapted to the high temperature heat treatment and conversion of the fluid hydrocarbon fuels commonly employed in the operation of internal combustion engines. One object of my invention is the provision of such a refractory structure which is capable of automatically producing and maintaining the high working temperatures which promotes that conversion by means of the catalytically-produced flameless combustion of a part of the hydrogen which constitutes a part of the fuel compound being treated. Another object is the provision of such a refractory ceramic structure which shall embody the properties of maintaining radiant high temperatures, for example temperatures exceeding one thousand degrees centrigrade, by means of flameless oxidation of certain of the fuel elements present, without ignition of the fuel, with a great increase over the usual thermal-electric resistance. Another object is the provision of such a ceramic structure having an extremely low coefficient of expansion, great tensile strength, and resistance to slagging at points in contact with adjacent and supporting metals, and also to glazing due to the surface fluxing action of possible contaminations in fuel and air. Another object is the provision of such a ceramic structure which shall have the characteristic catalytic or glowing action above alluded to, but which shall nevertheless be an insulator of great efficiency even at the highest temperatures normally reached by it. Other objects will appear from time to time in the course of the specification and claims.

I illustrate my invention more or less diagrammatically in the accompanying drawing, wherein—

Figure 1:
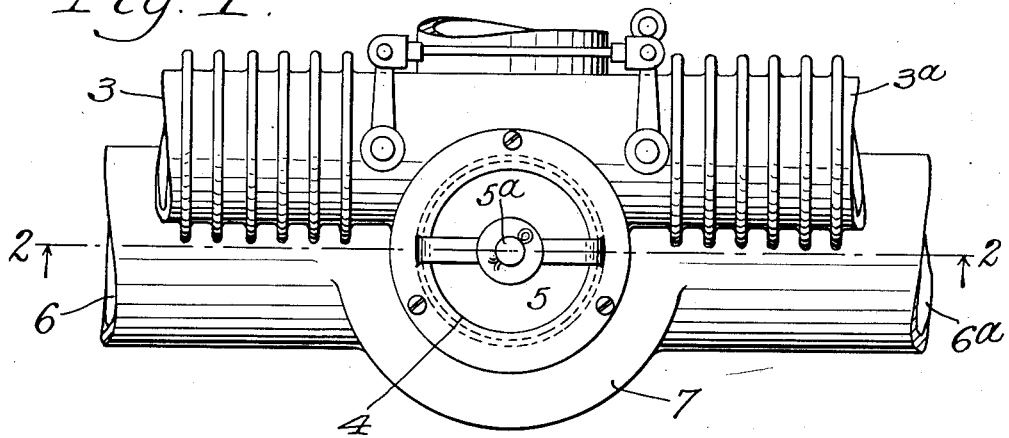
Figure 2:
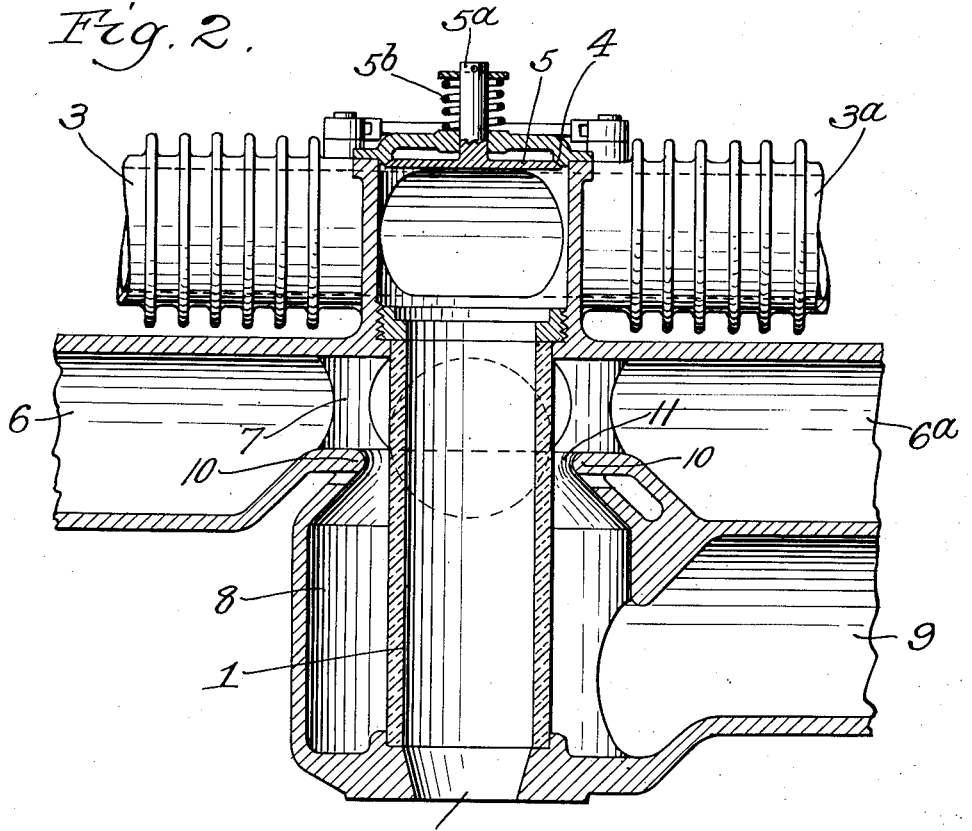

Figure 1 illustrates a plan view of a structure embodying one of my ceramic elements; and Figure 2 is a section on the line 2—2 of Figure 1.

Like parts are indicated by like symbols throughout the specification and drawing.

Referring to the drawing the unit shown in the figures is intended to be interposed between any suitable carbureting means and an ordinary internal combustion means. Neither carbureting means nor engine are shown since they do not of themselves form part of the present invention and their description and disclosure is not necessary to the understanding of the present invention. Suffice it to say that I employ a ceramic tube generally indicated as 1, which is aligned with the inlet passage 2 through which may be supplied the fuel or fuel and air mixture to be treated. The mixture so supplied, after it has flowed through the ceramic catalytic passage 1 may pass through the passages 3, 3a, to any suitable manifold or other means for eventually supplying the fuel to the cylinders of an internal combustion engine. A secondary supply of air may be admitted as through the port 4 the passage therethrough being controlled by the valve 5 with its valve stem 5a which may be automatically controlled, as by the spring 5b.

6, 6a, indicate the exhaust passages in communication with the circumferential passage 7 about one end of the tube 1. 8 indicates another circumferential passage in communication with the exhaust outlet 9. The passages 7 and 8 are separated for example by the flange or internal projection 10 which has in a qualified sense a venturi effect. The exhaust gases as they pass through the restricted space between the ledge 10 and the exterior of the ceramic tube 1 may aspirate further air through the passage 11, to thereby utilize the heat of final products of combustion and thereby insure the high temperature of the catalyst.

It will be understood that the structure, herein disclosed, with which my ceramic catalytic member is employed, does not of itself form part of the present invention and is inserted merely for purpose of illustration. It will be realized that my catalytic element may be employed with a variety of structures and for a variety of uses, although for purpose of illustration I show it applied to a structure adaptable for the treatment of hydrocarbon fuels as supplied to an internal combustion engine.

In the attainment of the various objects above outlined I employ a ceramic body, for example the tube 1 which may be formed of a mixture composed essentially of zirconia ($ZrO_2$) and a suitable bonding clay. It is desirable to employ a high percentage of zirconia, for example in excess of 60 per cent, to more completely retain its characteristics in a product, and to effect the desirable porosity, throughout the body. Inasmuch as the efficiency of the catalyst is in more or less direct relation to the area of the surface in contact with the fuel, additional porosity, or an increase in area may be obtained in any suitable manner, for example by producing voids and air cavities in the refractory body, by any of the methods commonly employed in the ceramic art.

Where an exceptional high formation of tensile strength is required, I may employ small percentages of a suitable flux in the body mixture, and in such case the introduction of a flux containing substantial percentages of such electrolytes as sodium and potassium salts or the like should be avoided, to retain the high electrical resistance of the glower or catalytic element. The essential properties of the catalytic device may be obtained by the addition to the structure, in the body mixture prior or by impregnation subsequent to the firing operation, of a relatively pure zirconium compound which is capable, after suitable heat treatment, of developing and maintaining a working temperature in excess of one thousand degrees centigrade by means of the flameless oxidation of a part of the hydrocarbon fuel subjected to the action of the catalyst. This oxidation takes place without any tendency to cause the occurrence of normal flame combustion throughout even such highly inflammable mixtures as the hydrocarbons currently used in internal combustion engines.

I find in practice that certain of the soluble zirconium salts are capable of forming permanent chemical compounds with salts of the platinum group and that such zirconium compounds retain the properties of low temperature of initial operation, characteristic of paladium and platinum, with the additional advantages of efficient high temperature operation with a correspondingly high ignition point, and the more desirable type of radiation characteristics found in zirconium compounds.

While I find that a considerable variation in composition is possible, I instance as a specific example of my improved catalytic element, a tubular die-form ceramic structure resulting from a mixture of 75 per cent of washed native zirconia and 25 per cent of a suitable clay mixture matured at cone 14, with a porosity of over 15 per cent.

This structure I may subsequently render active by means of impregnation with a 20 per cent solution of a double compound of zirconium and platinum chlorides, corresponding approximately to the formula $ZrOCl_2.PtCl_4.12H_2O$. The ceramic structure is thereafter dried and the temperature slowly elevated to a red heat. In actual test catalytic elements produced by the above method have been tested in a combustible atmosphere of air and an atomized hydrocarbon such as low test gasoline. These catalytic elements have proved capable in such an atmosphere, of rapidly developing and maintaining a working temperature in excess of one thousand degrees centigrade from an initial starting temperature of less than 400 degrees centigrade, without any occurrence of flame combustion in the adjacent combustible atmosphere. The demonstrations indicate that the maximum working temperatures attained are in a direct relation to pressure and turbulence and to the fuel percentage of the mixture.

I find that a marked increase in efficiency may be obtained by the addition of fractional percentages of chromium chloride in a proportion of about one-half of one per cent of the impregnating mixture. In some cases the addition of less than $\frac{1}{10}$ of one per cent has sufficed.

It will be understood that my invention is not intended to be restricted to the heat treatment of gasoline but is easily adaptable for treatment of a wide range of available engine fuels without departing from the nature and scope of the present invention.

Broadly, my invention may be described as providing commercially practicable means for attaining the advantages of fuel rectification possible only in a super-heated highly radiant and flameless passage zone. More definitely stated, I provide a commercially available refractory catalytic structure with a low coefficient of expansion which is nevertheless mechanically strong enough to withstand the severe effects of engine vibration during wide and rapidly varying changes in pressure and temperature. This is particularly important, as for example, when the member 1, as shown in the present drawing, is required to intercept or guide the intake and exhaust gases of an internal combustion engine during full capacity operation, the inflowing mixture engaging one side of the catalytic partition and the heated exhaust gases flowing across the other. The above desirable properties are effected by the flameless oxidation of a part of the hydrocarbon fuel mixture present. Furthermore notwithstanding its catalytic effect the ceramic element above described, impregnated as described, remains an extremely efficient electrical insulator at temperatures as high as I have so far been able to test.

An advantage, commercially stated is that my catalytic element is manufactured from materials commercially available at relatively low cost, with a complete elimination of such rare elements as thorium which have been generally considered as essential in attaining maximum radiant emanation from a body with a minimum consumption of thermal energy.

The catalytic structure has the advantage of being a non-conductor at high radiant temperatures, where the impregnation with the salt of the metallic conductor, platinum, is employed in a double compound with the salt of zirconium, which does not reduce to its metallic state, but becomes an insulating oxide interspersed with platinum particles. The non-conductivity of this oxide prevents the transmission of heat to the adjacent parts of the device, and thus aids in maintaining the high temperatures required for efficient conversion of the fuel.

It will be understood that the platinum catalyst is insulated by the zirconium oxide which prevents the platinum dispersed throughout the catalytic mixture from forming into massive metal. The platinum particles are thus isolated by the zirconium oxide.

It will be realized that whereas I have described and shown a practical and operative device, nevertheless many changes might be made in the size, shape, number and disposition of parts without departing from the spirit of my invention. I therefore wish my drawing to be taken as in a broad sense illustrative and diagrammatic rather than as limiting me to my specific showing.

I claim:

1. A catalytic member for use in treating hydrocarbons which includes a ceramic body structure containing catalytic zirconium and platinum halogen compounds.

2. A catalytic member for use in treating hydrocarbons which includes a ceramic body structure impregnated with zirconium and platinum halogen compounds.

3. A catalytic member for use in treating hydrocarbons which includes a ceramic structure containing a zirconium double compound corresponding generally to the formula $ZrOCl_2.PtCl_4.12H_2O$.

4. A catalytic member for use in treating hydrocarbons which includes a ceramic body structure containing zirconia, said ceramic body structure being impregnated with zirconium and platinum halogen compounds.

5. As a new article of manufacture, a refractory catalytic structure adapted to promote the flameless oxidation of hydrocarbon fuel mixtures subjected thereto, comprising a ceramic wall formed from a mixture of zirconium compounds and clay, said wall containing a catalytic chemical compound, including zirconia and platinum.

6. As a new article of manufacture, a refractory catalytic structure adapted to promote the flameless oxidation of hydrocarbon fuel mixtures subjected thereto, comprising a ceramic member impregnated with a zirconium compound including a small percentage of chromium.

7. As a new article of manufacture, a refractory catalytic structure adapted to promote the flameless oxidation of hydrocarbon fuel mixtures subjected thereto, comprising a ceramic member activated by a double chemical compound of zirconia and an element of the platinum group.

8. As a new article of manufacture, a refractory catalytic structure adapted to promote the flameless oxidation of hydrocarbon fuel mixtures subjected thereto, comprising a ceramic member containing zirconia, and further actuated by a double chemical compound of zirconia and an element of the platinum group.

9. As a new article of manufacture, a refractory catalytic structure adapted to promote the flameless oxidation of hydrocarbon fuel mixtures subjected thereto, comprising a ceramic member containing zirconia, and further activated by a double chemical compound of zirconia and an element of the platinum group, said compound including a relatively small percentage of a reaction-inducing element.

10. As a new article of manufacture, a refractory catalytic structure adapted to promote the flameless oxidation of hydrocarbon fuel mixtures subjected thereto, comprising a ceramic member containing zirconia, and further activated by a double chemical compound of zirconia and an element of the platinum group, said compound including a relatively small percentage of chromium.

Signed at Chicago, county of Cook, and State of Illinois, this 5th day of July, 1929.

ALICE MAUDE FAIRCHILD.